(12) United States Patent
Fisher

(10) Patent No.: US 8,790,106 B2
(45) Date of Patent: Jul. 29, 2014

(54) APPARATUS FOR PROCESSING SCRAP CROSS-LINKED THERMOSET ELASTOMERIC MATERIAL

(71) Applicant: Watson Brown HSM Ltd., Mississauga (CA)

(72) Inventor: James F. Fisher, Singhampton (CA)

(73) Assignee: Rep International, Corbas (FR)

( * ) Notice: Subject to any disclaimer, the term of this patent is extended or adjusted under 35 U.S.C. 154(b) by 0 days.

(21) Appl. No.: 13/684,202

(22) Filed: Nov. 22, 2012

(65) Prior Publication Data

US 2013/0136820 A1 May 30, 2013

Related U.S. Application Data

(60) Provisional application No. 61/563,689, filed on Nov. 25, 2011.

(51) Int. Cl.
| | | |
|---|---|---|
| B29C 47/38 | (2006.01) | |
| B29C 47/80 | (2006.01) | |
| B29C 47/10 | (2006.01) | |
| B29C 47/00 | (2006.01) | |
| B29B 7/46 | (2006.01) | |
| B29C 47/92 | (2006.01) | |
| B29K 105/26 | (2006.01) | |
| B29C 47/40 | (2006.01) | |

(52) U.S. Cl.
CPC ............. *B29C 47/10* (2013.01); *B29C 47/1063* (2013.01); *B29C 47/92* (2013.01); *B29C 2947/92704* (2013.01); *B29C 47/0009* (2013.01); *B29K 2105/26* (2013.01); *B29C 47/1009* (2013.01); *B29B 7/46* (2013.01); *B29C 47/1027* (2013.01); *B29C 47/408* (2013.01); *B29C 47/1018* (2013.01)

USPC ........ 425/204; 425/205; 425/208; 425/376.1; 425/378.1; 425/461

(58) Field of Classification Search
USPC .............. 425/204, 205, 207, 208, 209, 376.1, 425/378.1, 461
See application file for complete search history.

(56) References Cited

U.S. PATENT DOCUMENTS

| 3,956,981 A | * | 5/1976 | Pitt ................................. 100/39 |
| 5,198,171 A | * | 3/1993 | Kasahara et al. ........ 264/211.23 |
| 6,416,705 B1 | | 7/2002 | Dinzburg et al. |

(Continued)

FOREIGN PATENT DOCUMENTS

CA    2375136    12/2000

OTHER PUBLICATIONS

C. Tzoganakis, Q. Zhang, University of Waterloo, Devulcanization of Recycled Tire Rubber using Supercritical Carbon Dioxide, GPEC 2004 Paper Abstract #49, http://www.bvsde.paho.org/bvsacd/cd24/devulcaniza.pdf.

*Primary Examiner* — Yogendra Gupta
*Assistant Examiner* — Joseph Leyson
(74) *Attorney, Agent, or Firm* — Marks & Clerk

(57) ABSTRACT

An apparatus for processing thermoset cross-linked elastomeric scrap material has a batch-operated high shear mixer for inducing chemical reactions to partly devulcanize the material in a first devulcanizing stage. A continuously-operated multi-screw cooled extruder receives the partly devulcanized material from the high shear mixer and further devulcanizes the material by a mechanical shearing action in a second stage to produce an extruded product for revulcanization.

8 Claims, 1 Drawing Sheet

(56) References Cited

U.S. PATENT DOCUMENTS

| | | |
|---|---|---|
| 6,632,918 B1 | 10/2003 | Matsushita et al. |
| 6,908,573 B2 * | 6/2005 | Hossan .................. 252/511 |
| 7,461,970 B2 | 12/2008 | Brown |
| 2009/0082475 A1 | 3/2009 | Zhang et al. |

* cited by examiner

APPARATUS FOR PROCESSING SCRAP CROSS-LINKED THERMOSET ELASTOMERIC MATERIAL

CROSS REFERENCE TO RELATED APPLICATION

This application claims the benefit under 35 USC 119(e) of prior U.S. application no. 61/563,689 filed Nov. 25, 2011.

FIELD OF THE INVENTION

This invention relates to the treatment of waste products, and in particular to the devulcanization of waste rubber and other like cross-linked elastomeric products.

BACKGROUND OF THE INVENTION

Devulcanization is a method of recycling waste cross-linked rubber, such as scrap rubber for molding processes, to produce a material that can be revulcanized into useful products. Known processes for devulcanization are chemical, mechanical, ultrasonic, biological using microorganisms, or use microwaves or steam.

One such mechanical process is known as high shear mixing. This process provides extremely high levels of shear and extensional stressing thereby inducing chemical reactions in the material being processed. U.S. Pat. No. 7,461,970, assigned to the applicant, describes such a process. It comprises a mixing apparatus having two opposing mixing members rotatable relative to one another about an axis which have facing surfaces extending away from the axis and which define a mixing chamber therebetween. An array of mixing formations on at least one of the surfaces interact to mix the material and propel the material within the chamber toward the axis. This mechanical process has been demonstrated to have the ability to un-crosslink thermoset elastomers using shear energy such that approximately 60% of the original physical properties of the materials are recovered.

The material produced at the output of the high shear mixer still has some cross-linking, so it is sent for post processing in a roll mill. This consists of two horizontally arranged rollers running at slightly different speeds. Feedstock from the high shear mixer is loaded into the mill and as it passes between the rollers it is subjected to a shear force, which further breaks down the cross-linking bonds and produces a mixture of granules dispersed within a fluidized material. The material passing through the rollers is recycled to the top, and generally subjected to about 17 passes, after which it forms a sheet like material, which can then be used as a source of primary rubber for the original molding process. This process thus recovers material that would otherwise be wasted and allows it to revulcanized and made into useful products. While effective, it is batch operated since the material loaded into the roll mill has to be passed through the nip multiple times.

SUMMARY OF THE INVENTION

According to the present invention there is provided an apparatus for processing thermoset cross-linked elastomeric scrap material, comprising a batch-operated high shear mixer for inducing chemical reactions to partly devulcanize the material in a first devulcanizing stage; and a continuously-operated multi-screw cooled extruder for receiving the partly devulcanized material from the high shear mixer and further devulcanizing the material by mechanical shearing action in a second stage to produce an extruded product for revulcanization. Typically, the multi-screw extruder is a twin-screw extruder, although it could have more screw elements.

Embodiments of the invention thus provide an apparatus wherein preliminary processing is performed in the high shear mixer to produce partly processed rubber consisting of a granule liquid mix. The processing is then completed in the extruder, which produces processed pellets ready to be reused as source material for vulcanized products. Instead of being wasted this material can then be revulcanized and used to make useful products without the need for processing in a separate roll mill.

In another aspect the invention provides an apparatus for post-processing thermoset cross-linked elastomeric scrap material received from a high shear mixer, comprising a continuously-operated multi-screw cooled extruder for receiving the partly devulcanized material from the high shear mixer and further devulcanizing the material by mechanical shearing action to produce an extruded product for revulcanization, the multi-crew extruder comprising a high shear zone followed by a medium shear zone and a discharge orifice for outputting the extruded product.

BRIEF DESCRIPTION OF THE DRAWINGS

This invention will be described in more detail, by way of example only, with reference to the accompanying drawings, in which:—

DESCRIPTION OF EMBODIMENTS OF THE INVENTION

Figure 1:
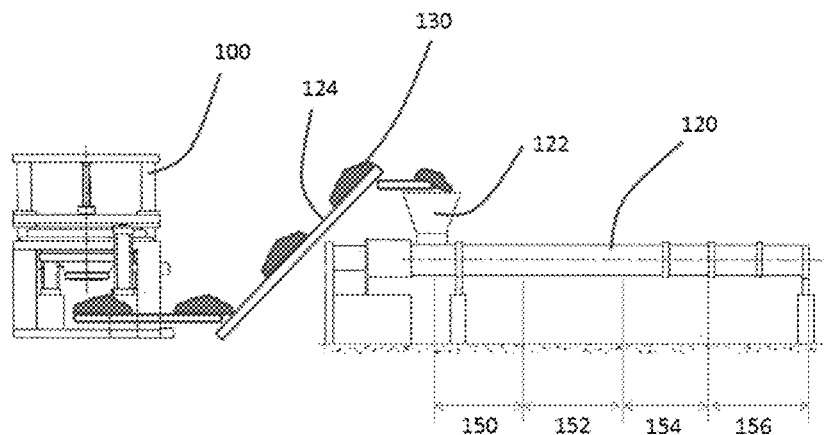
FIG. 1 is a schematic view of a first embodiment of a mixing apparatus in accordance with the invention.

FIG. 1 shows a schematic arrangement of the novel apparatus. The high shear mixer (HSM) 100, for example, of the type described in U.S. Pat. No. 7,461,970, is designed for batch processing the compound that is to be devulcanized. A conveyor 124, carries the output material 130, from the HSM 100, and deposits it into a surge hopper 122, which continuously feeds the inlet port of a twin screw extruder 120 for post processing the material.

The extruder 120 in this embodiment is a co-rotating twin-screw extruder having fluid cooling provisions in both its barrel and screws. The extruder comprises four zones, which are described in detail below. The output from the extruder can be fed through a die for pelletizing the compound, or via any other suitable outlet for producing sheet or granular material. The extruder screws are configured to include elements for rolling to provide a kneading action, elements for milling and elements for conveying. In the preferred embodiment the screws co-rotate, that is rotate in the same direction, to provide a higher shearing action while rotating a speeds no greater than 100 rev/min.

The configuration and operation of the extruder provides the following conditions for post processing the in-fed material. The four zones of the extruder 150, 152, 154 and 156 are shown in FIG. 1. The first zone 150 provides a high shear process with an approximate 0.015" gap between moving components and also provides about 500 passes of milling at a 2:1 ratio. Cooling is provided in this zone to limit the temperature of the material to no higher than 90° C. The second zone 152 is a conveying zone having maximum cooling to limit the temperature of the material to less than 40° C. The third zone 154 provides a medium shear process of about 250 passes of milling at a 1:1.25 ratio and is also cooled to about 40° C. The fourth zone 156 is a compaction zone, which feeds the processed material to the final discharge orifice of the extruder. The preferred embodiment is a die head for pelletizing the material output.

The screws and drive system are configured to operate the extruder at a rate of approximately 200-500 Kg/h. The upstream HSM batch process is sized in the range of 200 to 400 Liters to produce sufficient in-fed material to allow the extruder to operate continuously without exhausting the material being supplied to its barrel in-feed from the surge hopper.

Figure 2:
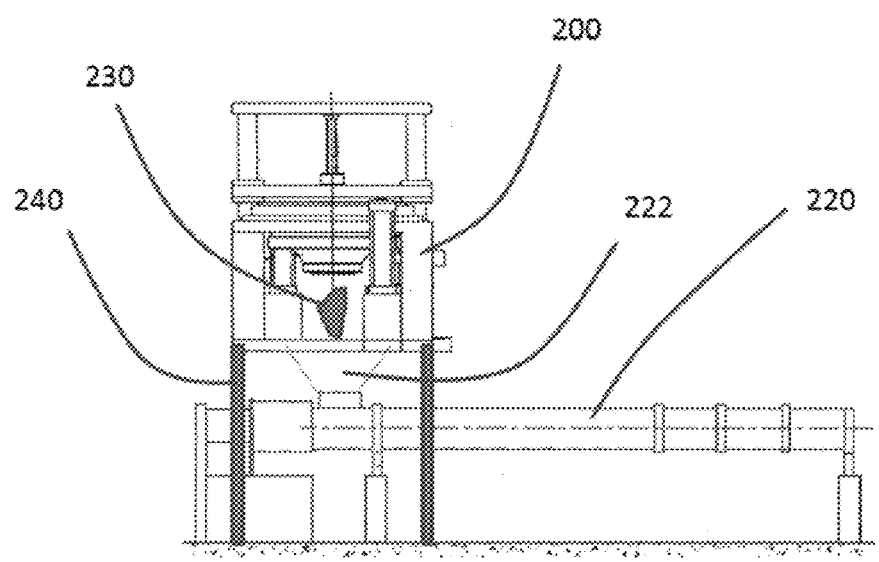
FIG. 2 is a schematic view of a second embodiment of a mixing apparatus in accordance with the invention.

FIG. 2 shows a second embodiment of the apparatus. A high shear mixer (HSM) 200 is provided for batch processing the compound that is to be devulcanized. The HSM 200 unit is mounted above the surge hopper 222 of the twin-screw extruder 220 by means of a structural frame 240. The output material 230, from the HSM 200 is deposited directly into a surge hopper 222 that continuously feeds the inlet port of a twin-screw extruder 220 for post processing the material. The extruder 220 is provided with the same four-zone configuration 150, 152, 154, and 156 as the first embodiment described above and illustrated in FIG. 1.

The processing of the material is completed in the extruder, which thus obviates the need to use a separate roll mill. The extruder produces pelletized material ready for use as source material in a vulcanizing process.

All references are herein incorporated by reference.

We claim:

1. An apparatus for processing thermoset cross-linked elastomeric scrap material, comprising:
    a batch-operated high shear mixer for receiving said thermoset cross-linked elastomeric scrap material and configured to induce chemical reactions to partly devulcanize the material in a first devulcanizing stage wherein the material retains some cross-linking; and
    a continuously-operated multi-screw cooled extruder including elements for rolling and elements for milling and configured to receive the partly devulcanized material consisting of a granule liquid mix from the high shear mixer and further devulcanize the material by mechanical shearing action in a second stage to produce an extruded product for revulcanization, said continuously-operated multi-screw cooled extruder rotating at speeds no greater than 100 rev/min and comprising in sequence:
    a first zone configured to limit the temperature of the material to no higher than 90° C. and to perform a high shear process with an approximate 0.015" gap between moving components and about 500 passes of milling at a 2:1 ratio, said first zone including milling elements for performing a milling action;
    a second zone configured to cool the material to less than 40° C.;
    a third zone cooled to about 40° C. and configured to provide a medium shear milling action of about 250 passes of milling at about a 1:1.25 ratio; and
    a fourth zone configured to compact the material and feed the compacted material to a discharge orifice ready for use as a source material in a vulcanizing process.

2. An apparatus as claimed in claim 1, wherein the discharge orifice is a die head configured to output pelletized material.

3. An apparatus as claimed in claim 1, further comprising a conveyor for feeding the partly devulcanized material from the high shear mixer to the multi-screw extruder.

4. An apparatus as claimed in claim 1, further comprising a surge hopper at an inlet to the multi-screw extruder for continuously feeding material from the high shear mixer.

5. An apparatus as claimed in claim 1, wherein the multi-screw extruder is a twin-screw extruder.

6. An apparatus for post-processing thermoset cross-linked elastomeric scrap material received from a high shear mixer, comprising:
    a continuously-operated multi-screw cooled extruder for receiving partly devulcanized material retaining some cross-linking and consisting of a granule liquid mix for further devulcanizing the material by mechanical shearing action to produce an extruded product for revulcanization, the multi-screw cooled extruder comprising in sequence:
    a first zone configured to limit the temperature of the material to no higher than 90° C. and to perform a high shear process with an approximate 0.015" gap between moving components and about 500 passes of milling at a 2:1 ratio, said first zone including milling elements for performing a milling action;
    a second zone configured to cool the material to less than 40° C.;
    a third zone cooled to about 40° C. and configured to provide a medium shear milling action of about 250 passes of milling at about a 1:1.25 ratio; and
    a fourth zone configured to compact the material and feed the compacted material to a discharge orifice ready for use as a source material in a vulcanizing process.

7. An apparatus as claimed in claim 6, wherein the discharge orifice is a die head configured to output pelletized material.

8. An apparatus as claimed in claim 6, wherein the multi-screw extruder is a twin-screw extruder.

* * * * *